Patented Oct. 30, 1951

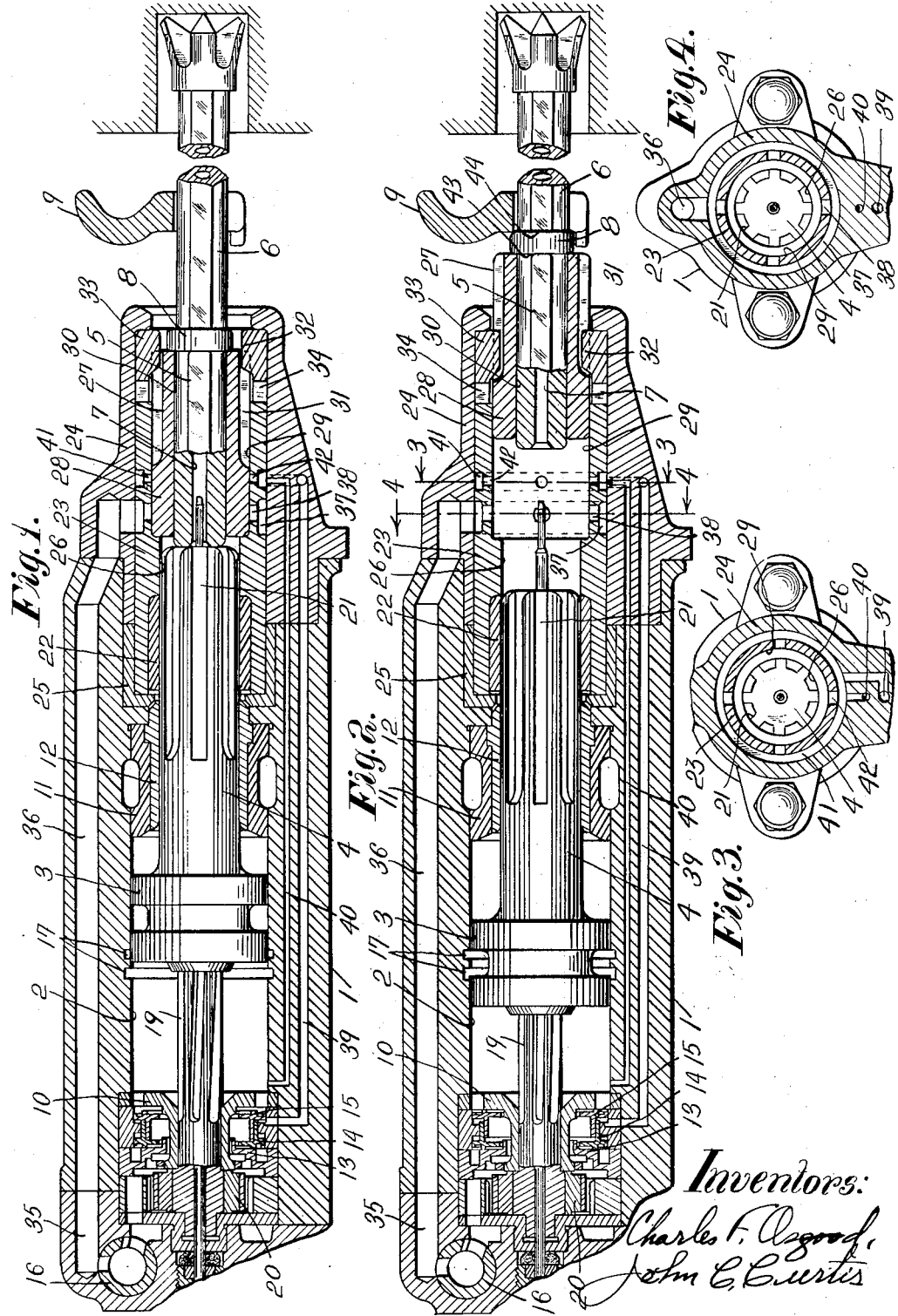

2,572,841

UNITED STATES PATENT OFFICE 2,572,841

ROCK DRILL

Charles F. Osgood, Franklin, Pa., and John C. Curtis, Claremont, N. H., assignors to Joy Manufacturing Company, a corporation of Pennsylvania Application May 31, 1946, Serial No. 673,542

18 Claims. (Cl. 121—10)

1

This invention relates to rock drills and more particularly to improved hole blowing means for a hammer rock drill.

In conventional hammer rock drills, a hollow drill steel is precussively actuated by the piston of a hammer motor, and pressure fluid is conducted from the front end of the motor cylinder through the drill steel to the bottom of the drill hole to clear away the cuttings from the drill bit. The flow of pressure fluid from the motor cylinder during normal operation of the drill is intermittent and relatively restricted; and at times it is desirable to supply pressure fluid continuously and in comparatively large volume through the drill steel to the drill hole, particularly when the steel shank is in a forward position in the drill chuck, as during retraction of the drill from the work, and this is usually accomplished by manually positioning the throttle valve to shut down the drilling motor and to effect a continuous supply of fluid to the drill steel bore directly from the throttle valve through a separate hole blowing passage leading into the drill chuck. The drilling motor, in conventional rock drills, is so designed that when the throttle valve is in hole blowing position, the fluid supply to the distributing valve mechanism of the drill is cut off and a restricted supply of pressure fluid is admitted from the throttle valve to the rear end of the motor cylinder so that when hole blowing fluid is continuously supplied to the drill chuck, the motor piston is maintained in a substantially balanced position substantially midway between the ends of the motor cylinder with the piston head substantially cutting off the cylinder exhaust.

The present invention contemplates an improvement over known devices of the character above outlined in that hole blowing means is provided which is automatically effective whenever the steel shank is in its forward position in the drill chuck, thereby to effect a continuous supply of cleansing fluid in comparatively large volume through the drill steel to the bottom of the drill hole. The invention, in a preferred embodiment, consists of improved automatic control means for the hole blowing means whereby when the drill is retracted from the work or when the steel shank is driven forwardly in the drill chuck, as when the drill bit penetrates a soft formation or a cavity, hole blowing is automatically effected, clearing the cuttings from the drill hole and thereby reducing the possibility of a stuck drill steel. In a preferred embodiment, the shank of the drill steel is received and supported in a sliding chuck bushing and the sliding chuck bushing serves as a valve to control the hole blowing passage; and the sliding bushing also controls fluid conducting passages leading from the drill chuck respectively to the fluid distributing valve mechanism and the rear end of the cylinder bore so that whenever the steel shank is in a forward position in the drill chuck, the valve mechanism is automatically stopped with the motor piston in a position substantially midway between the cylinder ends, causing a continuous blast of pressure fluid in large quantity to flow through the drill steel to the drill hole. Thus during automatic hole blowing, the hammer piston is automatically maintained in a substantially stationary hole blowing position in the motor cylinder with the cylinder exhaust substantially cut off by the piston head.

It is accordingly an object of the present invention to provide an improved hole blowing means for a hammer rock drill whereby whenever the steel shank is in a forward position in the drill chuck, hole blowing is automatically effected. Another object is to provide an improved automatic control means whereby whenever the steel shank is in a forward position in the drill chuck, the motor piston is automatically substantially stopped in a position wherein the piston head substantially covers the cylinder exhaust. A further object is to provide an improved slidable chuck bushing for receiving and supporting the shank of a drill steel and which serves as a valve for automatically controlling both the hole blowing means and the means for substantially stopping the motor piston. A still further object is to provide a fluid conducting passage which is automatically controlled by the slidable chuck bushing whereby whenever the steel shank is in a forward position in the drill chuck the drilling motor is automatically stopped. Still another object is to provide passage means controlled by the sliding chuck bushing of the drill chuck whereby whenever the steel shank is in a forward position in the drill chuck, pressure fluid is automatically continuously supplied to the rear end of the cylinder bore to maintain the motor piston in a substantially balanced condition substantially midway between the ends of the bore of the motor cylinder. Yet another object is to provide improved automatic control means for the hole blowing passage of a hammer rock drill whereby when the drill is retracted from the work, hole blowing is always automatically effected. A still further object is to provide improved automatic control means whereby whenever the steel shank is in a forward position in the drill chuck, the hammer motor is automatically stopped. A still further object is to provide an improved rock drill having improved means for automatically blowing the drill hole and embodying improved control valve means regulated by the position of the drill steel shank in the drill chuck so that when the steel shank is in normal drilling position, hole blowing is ineffective; and whenever the steel shank is in a forward position in the drill chuck, hole blowing always automatically occurs. These and other objects and advantages of the invention will, however, hereinafter more fully appear.

In the accompanying drawing there is shown for purposes of illustration one form which the invention may assume in practice.

In this drawing:

Fig. 1 is a view in central longitudinal vertical section taken through a hammer rock drill in which the improved automatic hole blowing means in embodied.

Fig. 2 is a sectional view similar to Fig. 1, showing the moving parts in hole blowing position.

Fig. 3 is a cross-sectional view taken substantially on line 3—3 of Fig. 2.

Fig. 4 is a cross-sectional view taken substantially on line 4—4 of Fig. 2.

In this illustrative embodiment of the invention, the improved automatic hole blowing means is shown associated with a hammer rock drill which may be generally like that disclosed in the John C. Curtis Patent No. 2,224,861, patented December 17, 1940. Evidently, features of the invention may be embodied in rock drills of various other types.

The rock drill disclosed herein comprises a motor cylinder 1 having a bore 2 containing a reciprocable hammer piston 3. The hammer piston has a reduced forward cylindric extension or striking bar 4 for delivering impact blows to the shank 5 of a conventional drill steel 6. The drill steel has an axial bore 7 and a usual collar 8 which is engageable with the yoke of a conventional drill steel retainer 9 when the steel is in its forward position in the drill chuck. The motor cylinder has a rear head 10 and a front buffer ring 11, the latter supporting a bearing sleeve 12 in which the piston striking bar is reciprocably guided. A conventional automatic fluid distributing valve mechanism 13, comprising cooperating relatively movable fluid distributing valves 14 and 15, controls the flow of pressure fluid from a throttle valve 16 through conventional fluid conducting passages to the opposite ends of the cylinder bore to effect reciprocation of the hammer piston. The cylinder has a usual piston controlled exhaust 17. The automatic fluid distributing valve mechanism and the associated fluid conducting passages and the cylinder exhaust are fully described in the above mentioned Curtis patent.

As is also disclosed in the patent above referred to, the drill steel is intermittently rotated by the hammer piston as the latter reciprocates to effect percussive actuation of the drill steel; and the mechanism for accomplishing this comprises a spirally grooved rifle bar 19 which has sliding interlocking engagement with spiral lugs of a usual rifle nut secured within the hammer piston. A rifle bar is automatically held against rotation in one direction by a conventional ratchet and pawl device 20, and this automatic ratchet and pawl device permits free rotation of the bar in the opposite direction. Thus, as the hammer piston moves forwardly to strike a blow on the steel shank, the pawls of the ratchet and pawl device slip relative to the teeth of the ratchet to permit free rotation of the rifle bar so that the piston moves freely forwardly to strike an unimpeded blow against the steel shank. Upon reversal of the hammer piston, the rifle bar is automatically held against rotation by the pawls engaging the teeth of the ratchet so that as the piston moves rearwardly, it is rotated by the spiral lugs of the rifle nut engaging the spiral grooves of the then stationary rifle bar. This rotative movement of the piston is transmitted to the drill steel through grooves 21 on the piston striking bar coacting with straight lugs of a usual chuck nut 22 secured to a rotatable chuck sleeve 23. The chuck sleeve is rotatably mounted in the bore of a front chuck housing 24 suitably secured to the front end of the motor cylinder and in a bearing sleeve 25 supported within a front bore of the motor cylinder. The chuck sleeve has a bore 26 which receives the forward end of the piston striking bar in the manner shown.

As fully described in the John C. Curtis application, Serial No. 667,383, filed May 4, 1946, a chuck bushing 27 has a cylindrical body 28 slidably mounted in an enlarged bore 29 in the chuck sleeve in advance of and in alignment with the bore 26. The bushing has an axial opening 30 of polygonal shape in cross section which receives the correspondingly shaped shank of the drill steel so that the shank and steel rotate together while permitting the steel shank freely to reciprocate in the bushing. On the outer periphery of the bushing body are longitudinal splineways 31 which engage splines 32 on a driver sleeve 33 arranged in the chuck housing bore 24 and clutched at 34 to the rotatable chuck sleeves so that sleeves 23 and 33 rotate together.

In accordance with the invention, improved hole blowing means is provided for automatically supplying continuously a comparatively large quantity of pressure fluid through the drill steel to the drill hole to blow the hole whenever the steel shank is in a forward position in the drill chuck. This automatic hole blowing means comprises passages 35 and 36 leading from the throttle valve 16 and communicating with an annular space or groove 37 surrounding the rotatable chuck sleeve 23. Ports 38 connect the space 37 with the bore 29 in the chuck sleeve. When the throttle valve 16 is positioned as shown in Fig. 1, pressure fluid may flow concurrently to the automatic fluid distributing valve mechanism 13 and to the passages 35 and 36 of the hole blowing means. When the sliding chuck bushing 27 is retracted in the sleeve bore 29 as shown in Fig. 1, the ports 38 are closed by the cylindrical portion of the bushing body so that fluid cannot flow from the hole blowing passages 35 and 36 to the steel bore 7. However, when the sliding chuck bushing is in its forward position in the sleeve bore, as shown in Fig. 2, pressure fluid may flow continuously from the hole blowing passages 35 and 36 through the annular space 37 and ports 38 to the sleeve bore 29, and thence through the bore in the drill steel to the bottom of the drill hole. The continuous flow of pressure fluid to the bore 29 during the hole blowing operation acts on the front end of the piston striking bar to retract the piston in the cylinder bore, and in order substantially to maintain the piston in a position substantially midway between the ends of the cylinder bore, there are provided fluid conducting passages 39 and 40 leading from an annular groove 41 on the rotatable chuck sleeve 23 respectively to the rear side of the front fluid distributing valve 15 and the rear end of the cylinder bore. The annular groove 41 is connected by ports 42 with the chuck sleeve bore 29. Flow of pressure fluid from the bore 29 to these passages 39 and 40 likewise is controlled by the sliding chuck bushing, and when the latter is in its forward position shown in Fig. 2, fluid may flow through these passages to act on the front distributing valve 15 to hold the latter closed, thus causing the drilling motor to stop. The fluid flowing through the relatively restricted passage 40 to the rear end of the cylinder bore substantially counterbalances the pressure acting on the front end of the piston striking bar, so that when the piston is retracted during hole blowing, it assumes the position shown in Fig. 2 with the piston head substantially covering the cylinder exhaust 17. When the sliding chuck bushing is retracted in the sleeve bore, as shown in Fig. 1, flow of pressure fluid from the sleeve bore to the passages 39 and 40 is cut off. Pressure fluid flowing to the sleeve bore 29 acts concurrently on the rear end of the chuck bushing to urge the latter toward its forward position in the sleeve bore wherein its forward end abuts at 43 the collar 8 of the drill steel and with the steel collar held forwardly at 44 against the yoke of the steel retainer 9. From the foregoing, it is evident that the sliding chuck bushing serves as a valve for automatically controlling both motor operation and blowing of the drill hole.

During normal drilling, with the parts as shown in Fig. 1, and as the hammer piston reciprocates, pressure fluid may intermittently flow in a well known manner from the front end of the cylinder bore through the grooves 21 on the piston striking bar to the bores 26 and 29 in the chuck sleeve and through the bore 7 in the drill steel to the bottom of the drill hole to clear away the cuttings. Pressure fluid in the sleeve bore 29 acts on the rear end of the sliding chuck bushing to urge the latter forwardly in the sleeve bore to hold its front end in substantial sealing contact with the steel collar 8 so that substantial leakage of fluid through the chuck bushing past the steel shank is prevented. In the event the usual drill bit of the drill steel penetrates a cavity or a soft formation in the work during drilling, or when the drill is retracted from the work, the steel shank will move forwardly in the drill chuck to bring the steel collar 8 into contact with the steel retainer 9; and since the chuck bushing, due to the action of pressure fluid thereon, slides forwardly with the drill steel shank, the bushing remains in substantial sealing contact with the steel collar. When the parts are in the position shown in Fig. 2 with the sliding chuck bushing in its forward position, the ports 38 and 42 are uncovered by the bushing body and pressure fluid may flow continuously in comparatively large volume from the hole blowing passages 35, 36 and sleeve bore 29 and through the steel bore to blow out the drill hole, and concurrently fluid flows through passages 39 and 40 to interrupt reciprocation of the hammer piston and to maintain the piston centrally in the cylinder bore with the piston head substantially closing the cylinder exhaust. Thus whenever the drill steel shank is in its forward position in the drill chuck with the steel collar against the retainer yoke, the hammer piston is automatically stopped and hole blowing is automatically effected. By automatically blowing the drill hole whenever the steel shank is in its forward position in the drill chuck, the possibility of sticking of the drill steel in the hole is substantially reduced. Other manners of use and advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What we claim as new and desire to secure by Letters Patent is:

1. In a rock drill, a drilling motor having a motor element for actuating a hollow drill steel which has a shank with which said motor element cooperates in the actuation of the drill steel, said motor including a chuck for receiving the shank of the drill steel and relative to which the shank is axially movable, said shank when in a rearward position in said chuck being actuatable by said motor element and when in its forward position in said chuck having moved out of the range of actuation of said motor element, and means for supplying cleansing fluid through the drill steel to the bottom of the drill hole to blow away the cuttings, said cleansing fluid supplying means including a cleansing fluid supply passage communicating with a source of cleansing fluid and with the hollow drill steel and controlling means for said passage including a movable control member governed by movement of the steel shank and automatically effective when the steel shank is in its forward position in said chuck to open said passage to effect fluid supply to the hollow drill steel, and said control member being automatically effective, when the steel shank assumes its normal rearward operating position in said drill chuck, to discontinue fluid flow through said passage to the hollow drill steel.

2. In a rock drill, a drilling motor for actuating a drill steel having a shank and including a cylinder containing a motor piston, an automatic fluid distributing valve mechanism for controlling the flow of motive fluid alternately to the opposite ends of said cylinder to effect operation of said motor piston and a chuck for receiving the shank of the drill steel and relative to which the steel shank is axially movable, the steel shank being movable axially from its normal rearward operating position to a forward position wherein the shank is out of the range of operation of said motor piston, and means for automatically supplying pressure fluid to said valve mechanism to interrupt operation of said motor when the steel shank assumes its forward position in said chuck, said pressure fluid supplying means including passages communicating with a source of pressure fluid supply and with said valve mechanism, and controlling means for said passages including a shiftable control member controlled by the axial position of the steel shank in said chuck for effecting fluid flow through said passages to said valve mechanism to stop said motor whenever the steel shank assumes its forward position in said chuck.

3. In a rock drill, a drilling motor for actuating a hollow drill steel which has a shank, said motor having a chuck for receiving the shank of the drill steel and relative to which the steel shank is reciprocable, the steel shank being reciprocable between its normal rearward operating position and a forward position out of the range of operation of said motor, said chuck having a part reciprocable with the steel shank, and means for automatically effecting a continuous flow of pressure fluid through the drill steel to the bottom of the drill hole to blow away the cuttings and including a passage communicating with a source of pressure fluid and with the hollow drill steel, and said reciprocable chuck part which is reciprocable with the steel shank being governed by the latter to effect control of said passage for effecting fluid supply to the hollow drill steel when the steel shank is in a forward position in said chuck, and said chuck part when in its forward position with the steel shank effecting opening of said passage.

4. In a rock drill, a fluid actuated drilling motor for actuating a drill steel which has a shank, and including an automatic fluid distributing valve mechanism having a movable valve element for distributing motive fluid to said motor for effecting operation thereof, said motor having a chuck for receiving the shank of the drill steel and relative to which the shank is reciprocable, the steel shank being reciprocable between a normal rearward operating position and a forward position out of the operating range of said motor, said chuck having a part reciprocable with the steel shank, and means for automatically interrupting operation of said motor whenever the steel shank assumes its forward position in said chuck and including a fluid conducting passage leading to a source of pressure fluid and communicating with said valve mechanism, said reciprocable chuck part governed by the steel shank and controlling fluid flow through said passage, and said chuck part when in a forward position with the steel shank in said chuck opening said passage to admit holding fluid to said movable element of said valve mechanism to stop said motor.

5. In a rock drill, a fluid actuated drilling motor having a cylinder bore containing a reciprocable hammer piston for percussively actuating a drill steel which has a shank and including an automatic fluid distributing valve mechanism having a movable valve element for controlling the flow of pressure fluid to the opposite ends of said cylinder bore for effecting reciprocation of said hammer piston, the steel shank being reciprocable between its normal rearward operating position and a forward position out of the range of operation of said hammer piston, said motor having a chuck for receiving the shank of the drill steel and relative to which the steel shank is reciprocable, said chuck having a part reciprocable with the steel shank, and means for automatically interrupting operation of said motor piston whenever the steel shank assumes a forward position in said chuck and including a fluid conducting passage leading to a source of pressure fluid and a passage communicable with said first mentioned passage for effecting a continuous fluid supply to the rear end of said cylinder bore, and said reciprocable chuck part being governed by the steel shank and controlling fluid flow through said passages and when in its forward position with the steel shank in said chuck effecting fluid flow through said passages to admit holding fluid to said element of said valve mechanism and to effect such continuous fluid supply to the rear end of said cylinder bore, thereby to stop said motor.

6. In a rock drill, a drilling motor for actuating a reciprocable hollow drill steel and movable bodily toward and from the work, and means for automatically effecting a continuous flow of pressure fluid in large quantity through the drill steel to the bottom of the drill hole to blow away the cuttings whenever said drilling motor is retracted from the work to withdraw the drill steel from the hole, said flow effecting means including passages communicating with a source of pressure fluid and with the drill steel, and a movable control member actuated on the retractive movement of said drilling motor for opening said passages to effect such fluid supply and said control member when said drilling motor is advanced toward the work with the drill steel in contact with the work closing said passages to discontinue fluid flow therethrough.

7. In a rock drill, a drilling motor for actuating a reciprocable hollow drill steel, said drill steel movable between a forward position out of the range of operation of said motor and a rearward normal operating position wherein it is actuated by said motor, and means for automatically effecting a continuous flow of pressure fluid in large volume through the hollow drill steel to the bottom of the drill hole to blow away the cuttings, said flow effecting means including passages communicating with a source of pressure fluid and with the hollow drill steel, and a shiftable fluid controlling valve reciprocable with and governed by the drill steel and disposable in a position to interrupt fluid flow through said passages when the drill steel assumes its normal rearward operating position with respect to said motor and in a position to effect fluid flow through said passages when said drill steel assumes its forward position as aforesaid.

8. In a rock drill, a fluid actuated drilling motor for percussively actuating a drill steel which has a shank and having a chuck for receiving the shank of the drill steel and relative to which the shank is reciprocable, said chuck having an outer element, the steel shank being reciprocable between a normal rearward operating position and a forward position out of the range of operation of said motor, and an automatic fluid distributing valve mechanism for distributing motive fluid to said motor for operating the latter, and means for automatically interrupting operation of said motor whenever the steel shank assumes its forward position in said chuck and including passages communicating with a source of pressure fluid and with said distributing valve mechanism, and a shiftable controlling valve arranged in said outer element of said chuck substantially in coaxial relation with the drill steel and reciprocable with and governed by the steel shank for controlling fluid flow through said passages to control the operation of said distributing valve mechanism.

9. In a rock drill, a drilling motor for percussively actuating a hollow drill steel which has a shank and having a drill chuck including a slidable chuck bushing for receiving and supporting the shank of the drill steel, said steel shank controlling the movement and position of said chuck bushing, and means for automatically effecting a continuous supply of pressure fluid through the drill steel to the bottom of the drill hole to blow away the cuttings, said supply effecting means including a passage communicating with a source of pressure fluid and with the hollow drill steel, and said slidable chuck bushing controlling fluid flow through said passage and automatically opening said passage to effect such continuous supply of pressure fluid to the drill steel when the steel shank assumes its forward position in said drill chuck.

10. In a rock drill, a drilling motor for percussively actuating a hollow drill steel which has a shank and having a drill chuck for receiving the shank of the drill steel and relative to which the steel shank is axially movable, said shank when in its rearward normal operating position in said chuck being percussively actuated by said drilling motor and when in its forward position in said chuck having moved out of the range of operation of said motor, and means for automatically interrupting operation of said motor and for concurrently effecting a continuous supply of pressure fluid through the drill steel to the bottom of the drill hole to blow away the cuttings whenever the steel shank is in aforesaid forward position in said drill chuck, and including passages communicating with a source of pressure fluid and leading to the hollow drill steel and to said motor respectively, and a movable control member for controlling said passages and whose position and movements are controlled by the steel shank for permitting fluid supply to said drilling motor to operate the latter and for concurrently interrupting flow of pressure fluid to the drill steel when the steel shank assumes its rearward normal operating position in said chuck.

11. In a rock drill, a drilling motor having a hammer piston for percussively actuating a reciprocable hollow drill steel which has a shank, the steel shank being movable axially and adapted to move between a normal rearward operating position and a forward position out of the range of operation of said hammer piston, and means for automatically effecting a continuous supply of pressure fluid through the drill steel to the bottom of the drill hole to blow away the cuttings whenever the steel shank assumes its forward position out of the range of operation of the hammer piston and including a passage communicating with a source of pressure fluid and with the hollow drill steel, and a movable control member for controlling said passage and controlled by the axial position of the steel shank for effecting fluid flow through said passage when the steel shank is in its forward position and for closing said passage to discontinue said fluid flow when the steel shank assumes said normal rearward operating position.

12. In a rock drill, a drilling motor having a hammer piston for percussively actuating a reciprocable hollow drill steel which has a shank and which is axially movable between a normal rearward operating position and a forward position out of the range of operation of said hammer piston, and means for automatically effecting a continuous supply of pressure fluid through the drill steel to the bottom of the drill hole to blow away the cuttings whenever the steel shank is in its forward position out of the range of operation of said hammer piston, said supply effecting means including a passage communicating with a source of pressure fluid and with the hollow drill steel and a shiftable controlling element reciprocable with the steel shank into the different positions of the latter and positionable to close said passage to interrupt such fluid flow when the steel shank assumes said normal rearward operating position.

13. In a rock drill, a drilling motor having a cylinder bore containing a reciprocable hammer piston for percussively actuating a drill steel which has a shank, the steel shank being movable from a normal rearward operating position forwardly into a position out of the range of operation of said hammer piston, and means for automatically interrupting reciprocation of said hammer piston whenever the steel shank assumes its forward position out of the range of operation of said piston and including a shiftable control element reciprocable with and governed by the steel shank, and a passage communicating with a source of pressure fluid and with the rear end of the cylinder bore of said motor for controlling operation of the latter, said control element when said piston is in its forward position out of the range of operation of said piston effecting fluid flow through said passage to the rear end of the cylinder bore.

14. In a rock drill, a fluid actuated drilling motor having a reciprocable hammer piston for percussively actuating a drill steel which has a shank and an automatic fluid distributing valve mechanism having a movable valve element for controlling supply of motive fluid to said motor for effecting reciprocation of said hammer piston, the shank of the drill steel being movable from a normal rearward operating position forwardly into a position out of the range of operation of said piston, and means for automatically interrupting reciprocation of said hammer piston whenever the steel shank has moved forwardly out of the range of operation of said piston and including a shiftable control element reciprocable with and governed by the steel shank, and a passage communicating with a source of pressure fluid and with said valve mechanism, said control element shiftable to a position to control fluid flow through said passage and positioned to open said passage to admit pressure fluid to said valve mechanism to hold said valve element thereof in closed position when said steel shank is in its forward position.

15. In a rock drill, a fluid actuated drilling motor having a cylinder bore containing a reciprocable hammer piston for percussively actuating a reciprocable hollow drill steel which has a shank, the steel shank adapted to move from its normal rearward operating position forwardly into a position out of the range of operation of said hammer piston, said motor including an automatic fluid distributing valve mechanism having a movable valve element for controlling the flow of motive fluid to the opposite ends of said cylinder bore for effecting reciprocation of said piston, and means for automatically effecting a continuous supply of pressure fluid to the drill steel to the bottom of the drill hole to blow away the cuttings whenever the steel shank assumes its forward position and including a shiftable control element reciprocable with and governed by the steel shank and passages communicating with a source of pressure fluid and with said valve mechanism and with the rear end of said cylinder bore respectively, said passages controlled by said reciprocable control element and said control element movable bodily with the steel shank to open said passages to effect a supply of pressure fluid to said valve mechanism to hold said valve element in closed position and to the rear end of said cylinder bore as aforesaid.

16. In a percussive tool, a fluid actuated hammer motor for percussively actuating a working implement, said motor including a cylinder containing a reciprocable hammer piston and an automatic fluid distributing valve mechanism including valve means actuated by pressure fluid and controlled by said piston for controlling the supply of motive fluid alternately to the opposite ends of said motor cylinder at opposite sides of said piston for effecting reciprocation of said piston, the working implement being movable axially from its normal rearward operating position with respect to said piston to a forward position out of the operating range of said hammer piston, and means controlled by the position of the working implement with respect to said hammer piston for automatically supplying pressure fluid to said valve mechanism to interrupt operation of said valve means thereby to stop said motor whenever the working implement assumes its forward position out of the operating range of said piston and including a passage communicating with a source of pressure fluid and with said valve mechanism and a movable control element governed by the position of the working implement for opening said passage when the working implement assumes its forward position as aforesaid.

17. In a percussive tool, a pressure fluid actuated hammer motor for percussively actuating a working implement, the working implement being movable longitudinally from its normal operating position with respect to said hammer motor to a forward position out of the range of operation of said hammer motor, and means for automatically interrupting operation of said hammer motor whenever the working implement has moved forwardly out of the range of said hammer motor and including a control valve element movable longitudinally with the working implement and a motor controlling passage communicating with a source of pressure fluid and with said motor, said control valve element controlling fluid flow through said passage and movable when the working element is in its forward position as aforesaid into a position to open said passage to effect a supply of pressure fluid to said motor to stop said motor.

18. In a rock drill, a drilling motor for actuating a reciprocable hollow drill steel which has a shank and including a chuck for slidingly receiving the shank of the drill steel, the steel shank being movable forwardly from its normal operating position into a forward position in said chuck out of the range of operation of said motor, and means for automatically effecting a continuous supply of cleansing fluid through the hollow drill steel to the bottom of the drill hole to clear away the cuttings whenever the steel shank is in its forward position in said chuck as aforesaid, and including a control valve element reciprocable with the steel shank and governed by movement of the latter and a cleansing fluid supply passage communicating with a source of cleansing fluid and with the hollow drill steel, said control valve element controlling fluid flow through said passage and movable into a position to open said passage to effect such flow when the shank of the drill steel is in its forward position as aforesaid.

CHARLES F. OSGOOD.
JOHN C. CURTIS.

REFERENCES CITED

The following references are of record in the file of this patent:

UNITED STATES PATENTS

| Number | Name | Date |
|---|---|---|
| 1,205,140 | App | Nov. 21, 1916 |
| 1,253,561 | App | Jan. 15, 1918 |
| 1,319,034 | App | Oct. 21, 1919 |
| 1,613,172 | Jasper | Jan. 4, 1927 |
| 1,637,192 | Jimerson | July 26, 1927 |
| 1,691,372 | Bayles | Nov. 13, 1928 |
| 1,813,774 | Smith | July 7, 1931 |
| 1,940,846 | Curtis | Dec. 26, 1933 |